US010731926B2

(12) United States Patent
Chopard et al.

(10) Patent No.: US 10,731,926 B2
(45) Date of Patent: Aug. 4, 2020

(54) UNIT FOR STORING THERMAL ENERGY

(71) Applicant: Hutchinson, Paris (FR)

(72) Inventors: Fabrice Chopard, Paris (FR); Paul Bline, Paris (FR); Cédric Huillet, Paris (FR); Fanny Geffray, Paris (FR); Boris Chauvet, Paris (FR); Nadine Poupa, Paris (FR); Christophe Dominiak, Paris (FR)

(73) Assignee: Hutchinson, Paris (FR)

( * ) Notice: Subject to any disclaimer, the term of this patent is extended or adjusted under 35 U.S.C. 154(b) by 66 days.

(21) Appl. No.: 15/753,816

(22) PCT Filed: Aug. 19, 2016

(86) PCT No.: PCT/FR2016/052100
§ 371 (c)(1),
(2) Date: Feb. 20, 2018

(87) PCT Pub. No.: WO2017/029463
PCT Pub. Date: Feb. 23, 2017

(65) Prior Publication Data
US 2018/0238636 A1  Aug. 23, 2018

(30) Foreign Application Priority Data

Aug. 20, 2015 (FR) ..................... 15 57830
Aug. 20, 2015 (FR) ..................... 15 57844

(51) Int. Cl.
*F28D 20/02* (2006.01)
*F01M 5/02* (2006.01)
(Continued)

(52) U.S. Cl.
CPC ......... *F28D 20/023* (2013.01); *F01M 5/021* (2013.01); *F01M 11/0004* (2013.01); *F28D 20/026* (2013.01); *B60H 1/3202* (2013.01); *F01M 2011/0016* (2013.01); *F01M 2011/0025* (2013.01); *F28D 2020/0078* (2013.01); *F28D 2020/0082* (2013.01); *Y02E 60/145* (2013.01)

(58) Field of Classification Search
CPC ......... B60H 1/00492; F28D 2020/0082; F28D 20/023; F28D 20/026; Y02E 60/145
See application file for complete search history.

(56) References Cited

U.S. PATENT DOCUMENTS

| | | |
|---|---|---|
| 2011/0030915 A1 | 2/2011 | Best |
| 2013/0105106 A1 | 5/2013 | Goswami et al. |
| 2016/0347146 A1* | 12/2016 | Wijaya ............... B60H 1/00335 |

FOREIGN PATENT DOCUMENTS

| | | |
|---|---|---|
| DE | 299 14 113 U1 | 10/1999 |
| WO | WO 2012/112050 A1 | 8/2012 |

* cited by examiner

*Primary Examiner* — Lindsay M Low
*Assistant Examiner* — Ruben Picon-Feliciano
(74) *Attorney, Agent, or Firm* — Blank Rome LLP

(57) ABSTRACT

A unit for storing and releasing thermal energy including a plurality of blocks each having a body the lateral walls of which delimit a chamber suited to receiving storage and release elements of PCM type, to be placed in heat exchange relationship with a refrigerating or heat-transfer fluid circulating between the chambers via passages; and elements for the thermal management of the chambers arranged around said chambers and at least some of which include a thermally insulating material and others a PCM.

8 Claims, 5 Drawing Sheets

(51) Int. Cl.
*F01M 11/00* (2006.01)
*F28D 20/00* (2006.01)
*B60H 1/32* (2006.01)

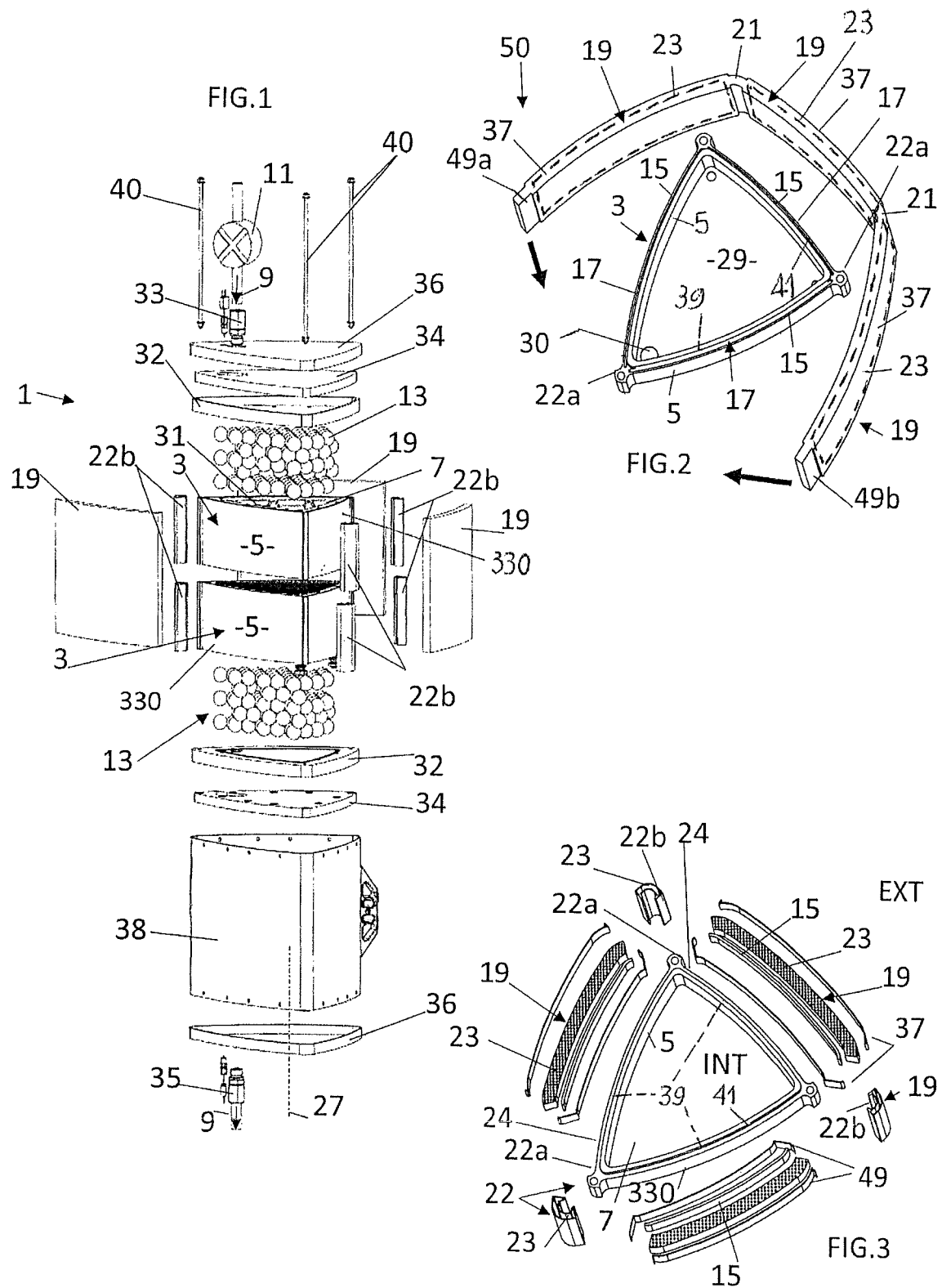

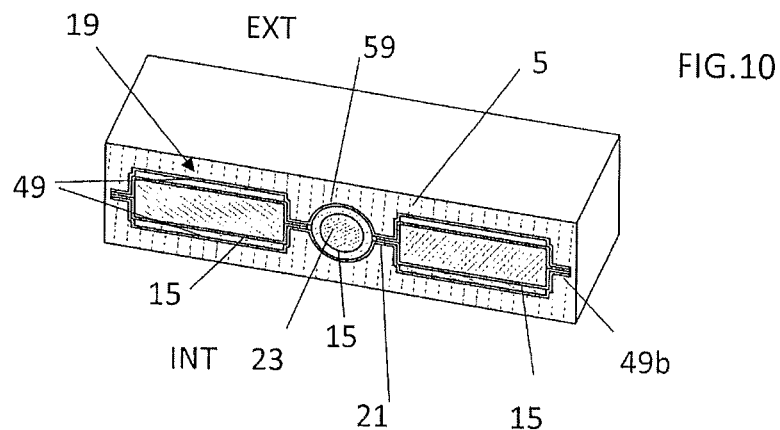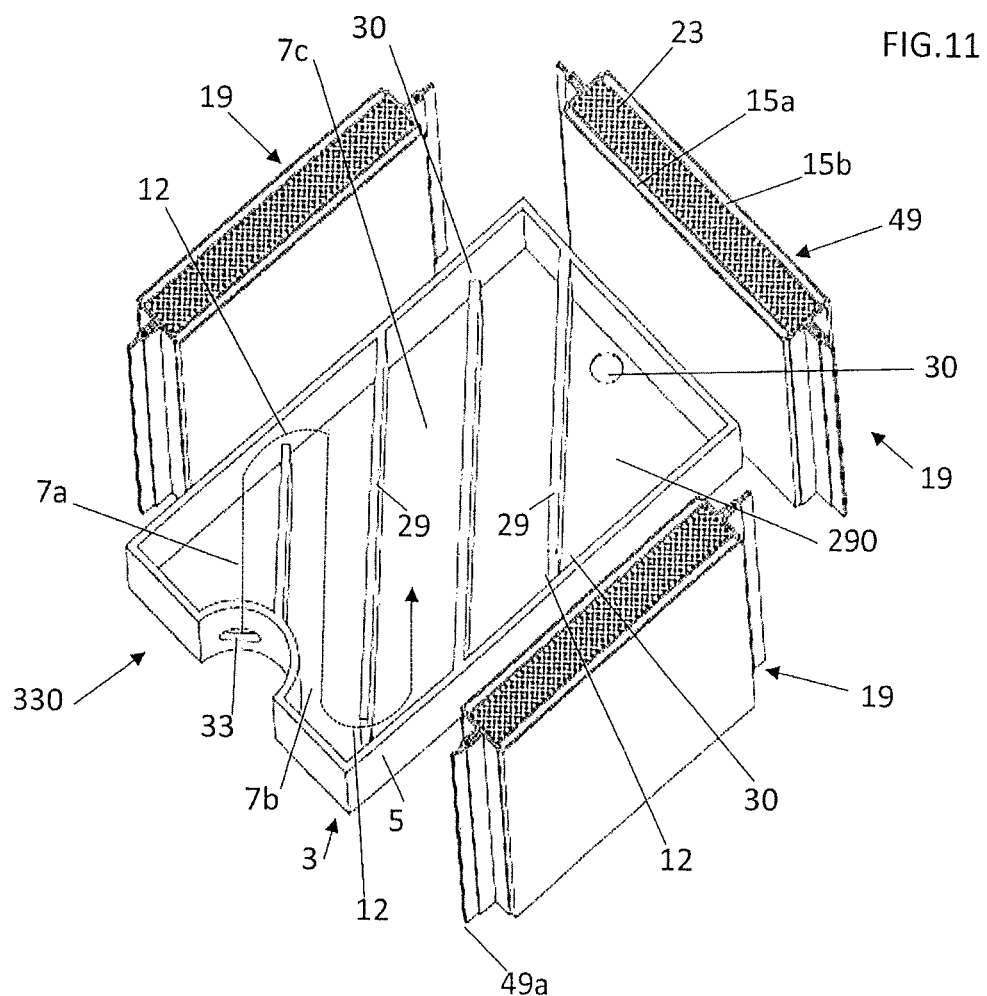

UNIT FOR STORING THERMAL ENERGY

This application is a national stage of International Application No. PCT/FR2016/052100, filed Aug. 19, 2016, which claims the benefit of French Patent Application Nos. 1557830 and 1557844, each filed Aug. 20, 2015, the contents of each of which are incorporated herein by reference.

The present invention relates to:
a unit for storing and releasing said energy,
and a circuit for lubricating an engine equipped with such a unit.

PCM storage and thermal management devices have already been proposed, the energy being provided by a refrigerating or heat-transfer fluid. The energy is stored during a so-called loading phase, at the time when the energy is available, and is then released, during a so-called unloading phase.

Among the problems treated here, the following will be noted:
the importance of the exchange surfaces with the fluid in circulation,
the residence time of the fluid during heat exchanges,
the adaptation according to the requests of customers and the volumes in question to be treated,
the compromise between the energy storage capacity and the conservation over time of said energy,
the mass production conditions (costs/ease),
possible adaptation to the automotive field in particular,
control of dimensions and weight.

It is in this context, and to respond to at least one part of said problems, that here is proposed a unit for storing and releasing thermal energy including:
a plurality of modular blocks, each including:
  individualised elements for storing and releasing said thermal energy including at least one PCM,
  a body comprising:
    a chamber receiving said elements including at least one PCM, the chamber being defined within outer walls of the body joined by a bottom closing on one side the chamber, which is open on the other side for placing therein or removing therefrom said elements including at least one PCM,
    at least one communication passage between the chambers of the blocks, for the circulation of the fluid between two adjacent chambers, in heat exchange relationship with said elements in each chamber,
    a sealing surface surrounding the open side of the chamber, for providing sealing in relation to the fluid,
attachment means suitable for attaching together the blocks, such that said fluid can circulate between same via the communication passages,
and elements for the thermal management of the chambers arranged around said chambers and at least some of which include a thermally insulating material and others a PCM.

Thus, a modular design will be associated with a possible mass production and energy performance that test results have shown.

Tie rods or bonds or welds may be suitable for axially connecting together the modular blocks. Of course, a seal may be associated with the sealing surface It is specified that a phase change material—or PCM—will designate any material capable of changing physical state. The thermal storage can be achieved by using the Latent Heat (LH) thereof: the material can then store or transfer energy by simple change of state, while maintaining a temperature and a substantially constant pressure, that of the change of state.

To balance the residence times between the chambers of the unit said elements including at least one PCM around which the fluid circulates are arranged loosely in the chambers (these elements are bulk elements).

One consideration was also to promote the circulation of the fluid as well as the heat exchanges in each block.

It is also proposed that a plurality of modular blocks are stacked along an axis, and that each block includes a communication passage passing through the bottom of the chamber thereof, to allow the fluid to circulate from one chamber to another, two successive passages being offset from one passage to the next parallel to said axis, to define baffles.

An advantage of the modular solution presented here is to be able to adapt the relative positions of the blocks in order to best satisfy the context. Thus, it is possible that it was necessary to arrange two adjacent modules with the chambers thereof face to face or back to back, for example.

It is also expected from the solution a modularity making it possible to adapt to the requirements of each case of implementation, a high energy performance, a possible mass production, and a cost price compatible with such a production adapted to the automotive field.

To further promote this production and a uniformity of residence times, the elements of PCM type of the unit, around which the fluid circulates, will be favourably arranged loosely in the chambers.

An ease of implementation and optimisation of exchange surfaces will thus be achieved.

Again, to perfect the thermal insulation and further promote the mass production, it is moreover recommended:
that where at least some of the thermal management elements including a PCM are arranged in at least one flexible envelope, which may optionally also contain thermally insulating material; this will make it possible to create one or more continuous panels around the chambers (unlike the tubes 2b of US 2011/0030915), or even provide an embodiment in the form of a VIP and/or a practical package, including if said envelope(s) must be integrated into the material of constitution of said outer walls of the bodies,
and/or that at least some of the thermal management elements including a thermally insulating material are under partial vacuum (VIP constitution), or even arranged around said outer walls of the blocks,
and/or that the body of each modular block integrates into said outer walls at least one cavity which receives at least some of the thermally insulating elements including a PCM.

The integration solution makes it possible to provide a production by moulding, with bodies made of polymer, increased standardisation and ease and safety of implementation. An arrangement outside, at the periphery, enables adaptation to certain dimensions, or even to fields of installation. The reference to a wall or a body made of mouldable material covers both injected and fibre-filled thermoplastic resins and thermosetting resins impregnating a fabric or a mat, such as a woven or a non-woven.

In order to combine mass production, installation reliability and efficiency regarding the peripheral thermal management, it is moreover proposed that the bodies are stacked together so that externally said outer walls define the supports against which the VIP are applied, which will then be laterally blocked by protrusions that will maintain a space having substantially the thickness of said VIP, between the outer walls of the bodies and an outer envelope that will surround the blocks.

To avoid energy losses and optimise space and weight, it is recommended:
that the modular blocks are stacked along an axis, and
that the communication passages pass through the bottoms of the chambers.

This will combine modularity/high energy performance/adaptability/ease of maintenance.

And to protect the insulated blocks, further supplement this insulation, and promote the integration into the vehicle, while still aiming for mass production, it is further proposed that the blocks being formed in a stack to achieve the unit referred to, the first and/or last blocks of said stack receive at least one cover which, opposite a said chamber opening, closes same, each cover being provided with a said thermal insulation element including a thermally insulating material and a connection for connecting said storage unit to an external circuit of refrigerating or heat-transfer fluid.

Applying the solution with functional module(s) presented above will have full meaning on a lubrication circuit of an engine defining a circulation path of a lubricant (typically oil) whereon are arranged, in fluid communication, the functional components of the engine to be lubricated, a lubricant sump (even if the tank is elsewhere, as in a dry sump) and said functional module(s).

In this context, it is even provided a preferred application (because integrated) wherein a lubrication circuit of an engine will define a circulation path of a lubricant whereon will be arranged, in fluid communication, functional components of the engine to be lubricated, a lubricant sump and a unit having all or some of the aforementioned characteristics or at least some of those that may follow.

If necessary, the invention will be better understood and other characteristics, details and advantages thereof will further appear upon reading the following description given by way of non-limiting example and in reference to the appended drawings, wherein:

FIG. 1 illustrates a storer/exchanger unit,

FIGS. 2, 3 show a module of the unit, in two possible embodiments, exploded,

Figure 4:
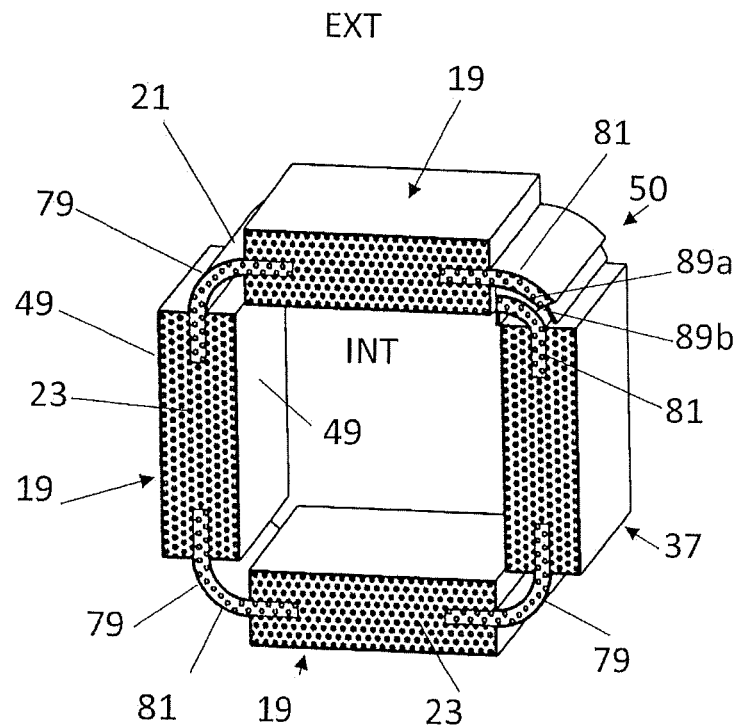
Figure 5:
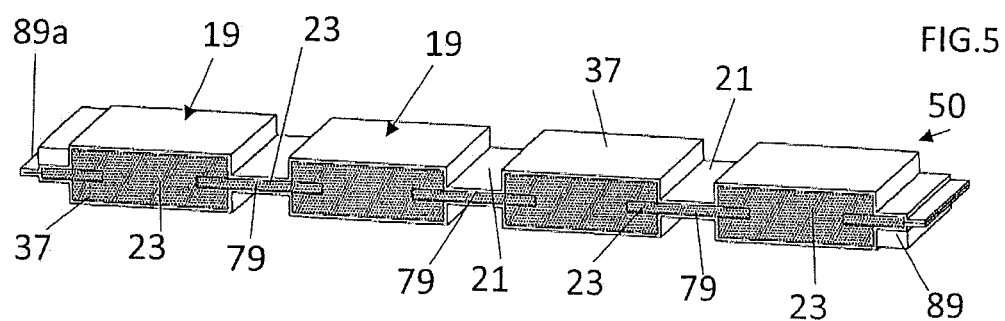
Figure 6:
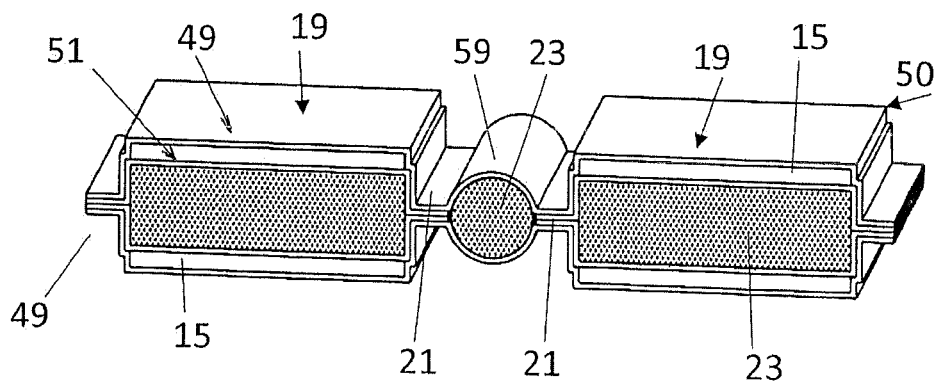
Figure 7:
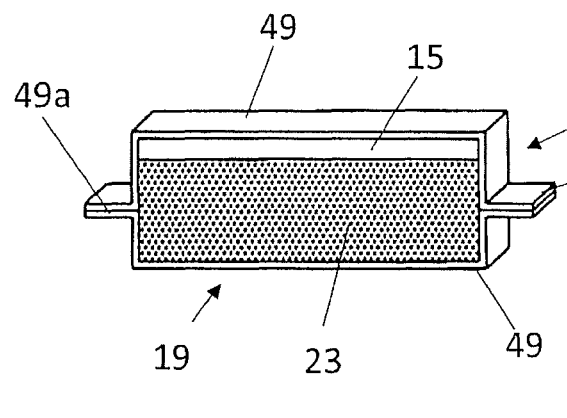
Figure 8:
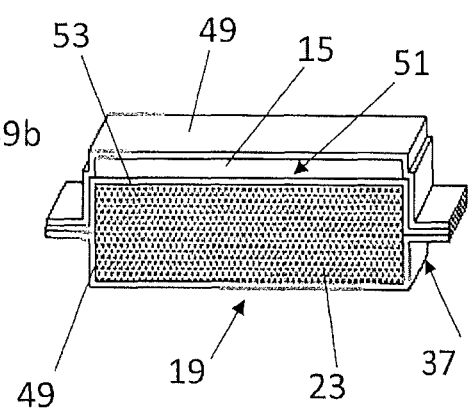
Figure 12:
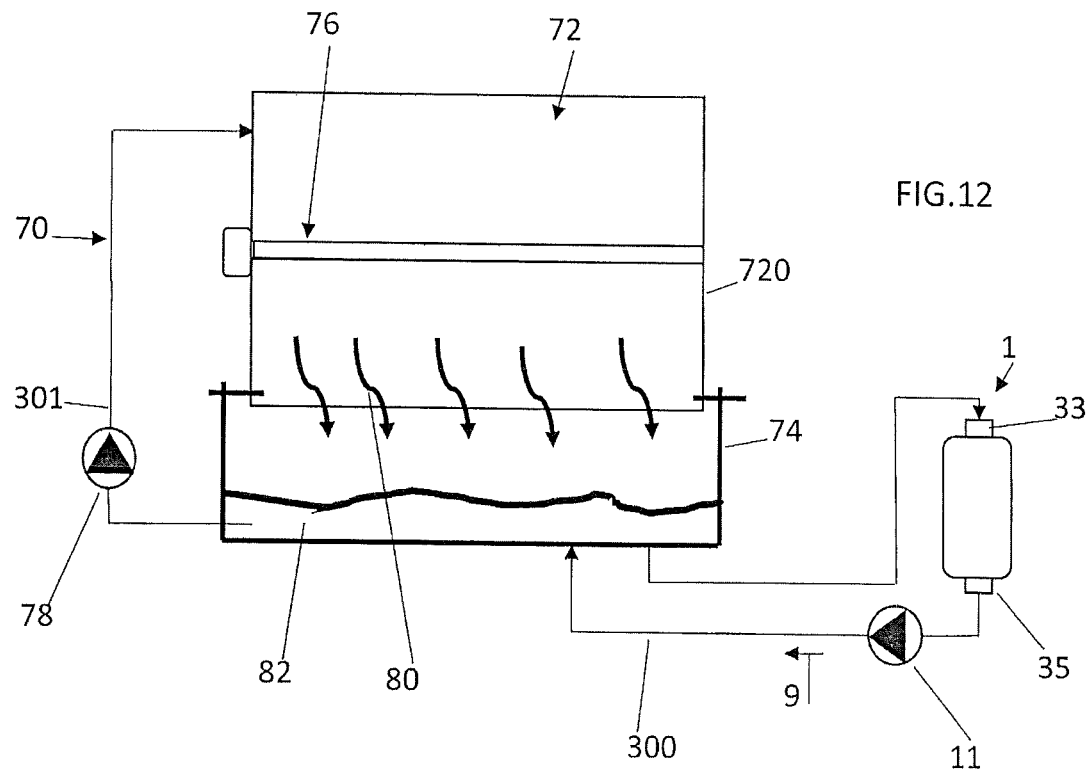
Figure 13:
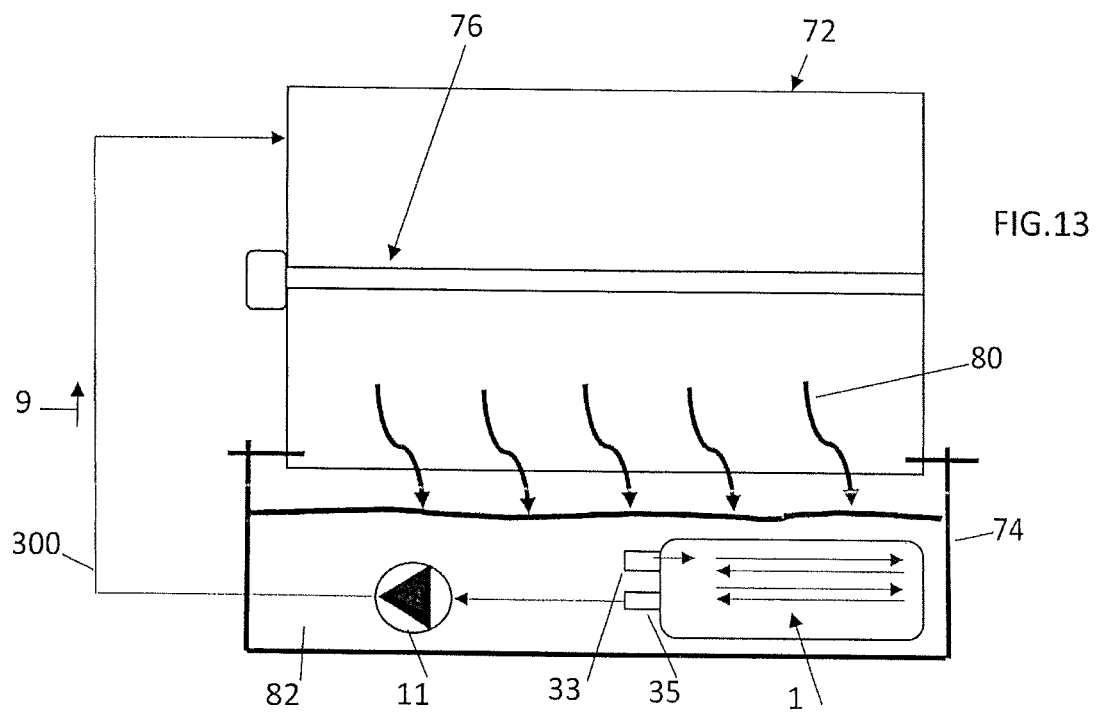

FIGS. 4 to 10 and 11 illustrate various embodiments of VIP, or mixed PCM/VIP pockets, in section; it must be imagined that the strip continues laterally in FIGS. 6-8, as well as FIG. 10 with the lateral wall (5 hereafter), and that said pockets (with the connection areas 21 thereof, if they exist) are closed along the sides thereof (such as in areas 49a, 49b hereafter) to make the partial internal vacuum possible, FIG. 10 also illustrates an integration of such pockets and connection areas 21 into the thickness of said lateral wall 5, FIG. 11 also illustrates a module body with internal baffles, and FIGS. 12, 13 illustrate two assemblies, on an oil circuit.

It must be considered that the examples of operational solutions presented hereafter and the versions illustrated may be combined with one another. Mixtures of solutions may thus be easily deduced therefrom, such as, for example, FIG. 2 an absence of protrusion 22a on a body 330, or an absence of connections 21 between the pockets 19.

The diagrams in the figures (in particular FIG. 1) therefore show all or part of a unit 1 for storing, and favourably subsequently releasing, thermal energy provided by a refrigerating or heat-transfer fluid 9.

Of modular construction, the unit 1 includes:
a plurality of structures or modules 3, each provided with a body 330 having a peripheral wall 5 and a bottom 29 surrounding an inner volume (or chamber) 7 where the refrigerating or heat-transfer fluid 9 is present, for having circulated in said volumes under the action of circulation means 11, and elements 13 for storing and restoring (subsequently) thermal energy,
at least one layer or element 15 containing a PCM that can be arranged in the peripheral wall 5 (for example, in at least one peripheral cavity 17 of said wall, as shown in the figure) or around said peripheral wall, in particular in the envelope(s) 37 in FIGS. 8, 9 in particular,
elements 19 with thermally insulating material 23 and preferably of VIP constitution arranged laterally around each volume 7, individually (FIG. 2) or in groups (FIG. 1).

The modules 3 are arranged along a stacking axis 27. And each bottom 29 is transverse to the peripheral wall 5 (by joining the sides) and here opposite, along the axis 27, to an opening 31 through which can be placed or removed from the corresponding volume 7 the elements 13 that may be balls or spheres.

It is meant by "VIP constitution" a structure under partial vacuum containing at least one thermally insulating material a priori porous. However, it will be noted that the expression "under vacuum" (for example, between $10^0$ Pa and $10^4$ Pa) includes the case where said partial vacuum would be replaced with a "controlled atmosphere"; the insulating pockets would be filled with a gas having a thermal conductivity lower than that of the ambient air (26 mW/m·K).

And "Porous" designates a material having interstices enabling the passage of air. The porous materials, with open cells, therefore include foams but also fibrous materials (such as glass wool or rock wool). The passage interstices that can be qualified as pores have sizes less than 1 or 2 mm so as to be able to guarantee a good thermal insulation, and preferably at 1 micron, and preferentially further at $10^{-9}$ m, for questions in particular of resistance to ageing and therefore possible lower negative pressure in the VIP envelope.

As shown in FIG. 3, retaining protrusions 22 attached with the peripheral wall(s) 5 can be provided, in particular, in the angles of the outer walls forming the peripheral wall 5, two protrusions delimiting between same, laterally and around the peripheral wall, an open space 24 where is arranged at least one of the thermally insulating elements 19 of VIP constitution.

In this regard, the embodiment in FIG. 2 provides an alternative where the pockets 19 are still individual but are no longer independent from one another. This is a series of such pockets 19 of VIP constitution joined by intermediate portions 21 where two successive pockets can be articulated with one another.

Each pocket will contain at least one thermal insulating material 23, and will extend laterally (transversally to the axis 27) around a volume 7 (preferably all around), to thermally insulate same from the exterior (EXT) with the content thereof, the layers 15/23 defining elements for the thermal management of the temperature in the volumes 7.

The, or each, layer 15 containing a PCM may be arranged in the quasi-perimetric cavities 17 of the wall 5 or all around said wall, in particular within the pockets 19.

In said solution with pockets 19 arranged laterally around the wall 5, a sleeve or sheath 38 of mechanical protection open at both ends, for example made of hard plastic, envelops the modules 3, the portions 32, 34, 36 and the pockets 19, which are therefore interposed between the walls 5 and said sheath. Extending around the protrusions 22 and the thermally insulating elements of VIP constitution 19, the sleeve 38 participates in retaining the elements 19 in the spaces 24, as shown in FIG. 3.

The retaining protrusions 22 may be in a plurality of portions. Thus, in particular, it can be seen in FIG. 3 a solution wherein same are in two portions 22a, 22b. The portion 22b is removable and can be attached, by the engagements of forms with one another, with the portion 22a which is integral with the peripheral wall 5, in outer periphery thereof. The removable portions 22b may each be presented as a clip or an end piece to be engaged by forced elastic deformation, or by lateral sliding, around the fixed portion 22a. Said retaining portions 22b may be thermally insulating and contain for this a layer 23 made of thermally insulating material (which therefore may be of VIP constitution, such as a pocket 19).

Typically, the bodies 330 of the modules 3 will have angles and the retaining protrusions 22 will be like rods extending in the angles, as illustrated.

Unlike the above, rather than therefore be hollow such as a clip, the removable portion 22b could have a protrusion towards an outer hollow of the fixed portion 22a to engage with. Another possibility: the two portions 22a, 22b would only form one to define a protrusion integral with the wall 5.

The peripheral walls 5 and bottoms 29 of the modules or structures 3, which may be integral, may in particular be made of polyamide, of another rigid polymer (medium or high-density polyethylene, for example), or of composite (filled with fibres), or even of metal.

Passages 30 communicating at least two by two, through the bottoms 29, enable the fluid 9 (which may be water or oil, or even a gas, such as air), to circulate, from an inlet 33 to an outlet 35, between the modules or structures 3. Said fluid 9 will globally circulate along the axis 27.

Favourably, the passages 30 will provide a direct communication between two successive chambers or volumes 7, without leaving the overall space of the joined modules 3.

Where this is necessary, since the open structures 3 can be arranged in particular back to back (FIG. 1) or conversely face to face, one or more covers 32, here two double, close the openings 31 of the end modules, so as to seal each volume 7. Externally, each cover 32 may be lined by a single pocket 34 of VIP constitution. And a mechanical protection plate 36 may close the whole, along the axis 27, as illustrated.

The inlet 33 and outlet 35, which pass through the portions 32, 34, 36 if same exist, to lead into the respective volumes 7, define connection elements as shown in FIG. 1.

Again, for the sealing in relation to the fluid 9, a first sealing surface 39 surrounds the opening 31 of each chamber 3, which opening is therefore located transversally to the axis 27, opposite the bottom 29.

Attachment means 40, such as axial tie rods, will moreover be preferably provided to engage with the bodies of the modules 3 in order to provide an attachment between said bodies placed in contact and facing. After that, the sleeve 38 will be externally put in place.

The bodies 330 being attached together, along the axis 27 in the stacked arrangement considered, the first sealing surface 39 will therefore be pressed either against a second sealing surface defined externally at the location of the bottom 29 of an adjacent body, in a relative arrangement of the bodies back to back, or against the first sealing surface of such an adjacent body, in a relative arrangement of the bodies face to face. At least one peripheral seal 41 may be arranged on one side and/or the other.

In place of the tie rods and seals, it is possible to provide a welded or bonded solution of the modules together, along the axis 27.

It will be understood that the assembly 1 will be thermally efficient thanks to the PCM/thermal insulation complex that makes it possible to associate:
a thermal insulation of the modules in relation to the exterior (EXT),
a retarding effect related to the changes of states of the PCM.

The thermally insulating material 23 may be a glass wool, a polyurethane or polyisocyanurate foam, or even more favourably a porous, or even nano-porous material, such as a silica or an organic aerogel or the pyrolate thereof impregnated in a porous network and arranged in a vacuum enclosure, to therefore define at least the vacuum insulation panel VIP already mentioned.

As a material 15, or constitution of elements 13 contained in each inner volume 7 and with which the fluid 9 is in heat exchange relationship, a rubber composition such as described in EP2690141 can be provided, namely a crosslinked composition based on at least one room temperature vulcanising "RTV" silicone elastomer and including at least one phase change material (PCM), said at least one silicone elastomer having a viscosity measured at 25° C. according to the standard ISO 3219 which is less than or equal to 5000 mPa·s. In said composition, the elastomer matrix will mainly consist (i.e. according to an amount greater than 50 phr, preferably greater than 75 phr) of one or more "RTV" silicone elastomers. Thus, said composition could have the elastomer matrix thereof including one or more silicone elastomers according to a total amount greater than 50 phr and optionally one or more other elastomers (i.e. other than "RTV" silicones) according to a total amount lower than 50 phr.

In particular, a material based on paraffin, eutectic fatty acid (myristic-capric) or eutectic hydrated salt (calcium chloride+potassium) could also be used as a constituent material, alone or not, of the aforementioned elements. Alternatively, the PCM of the elements cited could be based on fatty acid, paraffin, or eutectic or hydrated salt. In fact, the choice of the material and the packaging thereof in each element concerned, in particular the dispersion thereof within a polymer matrix, will depend on the intended application and the expected results.

A priori the elements 13, here individualised, such as the spheres mentioned, will be arranged loosely in the volumes 7. The size ratio of the individualised structures/dimensions of each sub-volume will therefore be defined accordingly, in order preferably to optimise the exchange surfaces of the elements 13/fluid 9.

Thus, the elements 13 of PCM type will not be tubes or, preferably, will not be arranged in an organised manner (as they are in US 2011/0030915), in order to promote the conditions of implementation (no storage) and the residence times of the fluid in the chambers, in exchange relationship with said elements 13, in particular promoting a circulation with many meanders due to the obstacles constituted by said elements 13 through the axial circulation 27 of the fluid.

As it is important that the elements 13 of PCM type exchange broadly with the fluid 9, the PCM 15 of the thermal management elements (15, 19, 23) arranged around the chambers or volumes 7 must form one or more panels (structure peripherally continuous or not as shown in the figures, in particular 2, 3, 11) which without contact with any refrigerating or heat-transfer fluid, will work thermally according to said exchanges made in the chambers.

This is why the PCM 15 of the peripheral elements is called "thermal management": same participates in the thermal management of the chambers. This is not the case of the tubes 2b in US 2011/0030915.

Thus, peripherally arranged around the chambers or volumes 7, said material placed in the soft or flexible envelopes thereof, such as 37, 51, will favourably form one or more walls or thermal management panels 19 for the thermal management.

If the peripheral insulating pockets 19 follow one another continuously around a wall 5, and although this is not strictly imposed (a form closed thereon, as a sleeve being possible), it will a priori be preferred that the elements 19-21 define together an articulable panel 50 (as in FIGS. 4-6) that can:
typically in an operational state, be closed thereon (FIG. 4, wherein the structure 50 is to be imagined to thus be arranged around a wall 5 to be insulated),
and be deployed substantially flat, for example to be stored and in a state that may be non operational (FIG. 5 or 6).

Independently of a discontinuous or not embodiment of the pockets 19, the following presents, in reference in particular to FIGS. 3 and 5-8, a favourable embodiment of said pockets and intermediate portions 21 if same exist. Thus, even if only one pocket 19 is shown, it is sufficient to reproduce the model then on either side to continue the structure, if desired.

Figure 9:
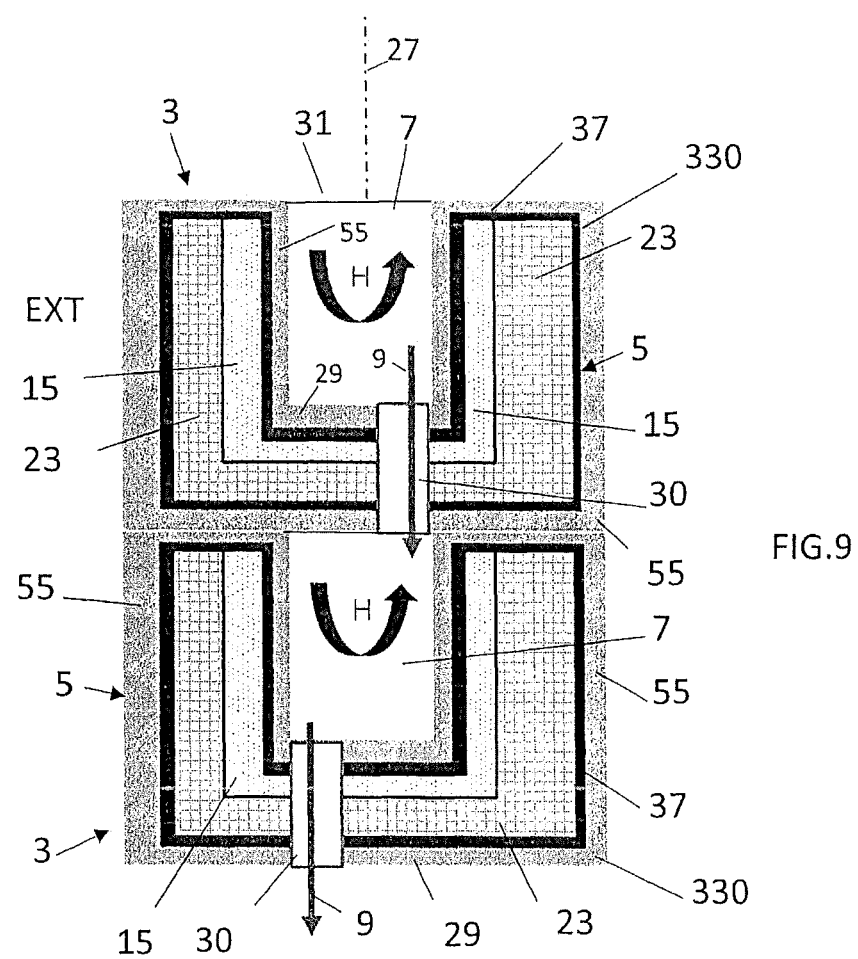

It can thus be seen that in both a continuous and discontinuous solution, each pocket 19 of VIP constitution can then include (as seen in exploded view in FIG. 3):
at least one first element, or one first layer 15 containing the PCM, beside (operationally outside) of which is arranged a second element consisting of said thermally insulating material 23, and
at least one closed outer envelope 37 which contains the first and second elements and consists of at least one flexible sheet 49 sealed to the PCM, with:
a) either said flexible sheet 49 that is furthermore sealable (thermally/chemically, in 49a, 49b around the pocket) and impervious to the porous material 23 and to air (or even also to water), so that an air space prevailing in the envelope 37, a so-called for receiving (VIP) is thus defined, as shown in FIG. 8,
b) or the second thermal insulating element 23 contained within a second closed envelope 51 with flexible sheet 53 that is sealable and impervious to the porous material and to air (or event to water), so that an air space prevailing in the second envelope, a so-called vacuum insulation panel (VIP) is thus defined, as shown in FIG. 9.

It should be noted that two layers 15 containing one or more PCM could (as shown in FIG. 6) be arranged on either side of the layer of porous material 23, or even no such layer, if provided only in the wall 5, as shown in FIG. 2.

The porous thermal insulation 23 that could therefore be nanostructure, will therefore be confined in a flexible sheet 49 or 53 which will not allow water vapour or gases to pass through. The VIP obtained will be emptied of the air thereof to obtain, for example, a pressure of a few millibars, then may be sealed. Typically, the thermal conductivity A of such a VIP will be 0.004/0.008 W/m·K. The use of vacuum insulation panels should make it possible to achieve a thermal resistance R=5 m²·K/W with only 20 mm of insulation.

A possible composition of the material 23 is the following: 80-85% of silica dioxide ($SiO_2$), 15-20% of silicon carbide (SiC) and possibly 5% of other products (binder/fillers). A thickness of 0.4 to 3 cm is possible. Examples, that can be applied here, of VIP and super-insulating material are furthermore provided in PCT/FR2014/050267 and in WO2014060906 (porous material), respectively.

The solutions presented above must enable, in an acceptable volume and weight in particular by aeronautical or automobile manufacturers, rapid storage of an available thermal energy after approximately 6-10 minutes, the retention of said energy for 12 to 15 hours, before the rapid release thereof, typically a few minutes (in particular less than 2-3 minutes), for example to an engine during a cold start phase.

The flexible sheets 49, 53 of the VIP may typically be made in the form of a multilayer film comprising polymer films (PE and PET) and aluminium in, for example, laminated (sheet of thickness of around ten micrometres) or metallised (vacuum deposition of a film of a few tens of nanometres) form. The metallisation can be carried out on one face or on both faces of a PE film and a plurality of metallised PE films can be complexed to form a single film. Example of design of the film: —PE inner sealing, approximately 40 μm—Al vacuum metallization, approx. 0.04 μm—PET outer layer, approximately 60 μm.

In case b) above where there is a double sheet: inner 53 and outer 49, the sheet 49 may, however, therefore only be a simple polymer film, such as a PE 0.05 to 0.2 mm thick, the object of this outer sheet 49 can then only be to create a simple bag for containing/joining together the elements or blankets 15 and 23.

It should also be noted that the/each envelope 37, 51 may typically be formed of two sheets arranged on either side of said material elements 15 and 23 and joined together, as in 49a, 49b in FIG. 2,7 or 10 (only figures where said references are marked).

In any case, an advantage of said sheets directly in contact with one another at the location of the intermediate portions 21, as illustrated, if same are a plurality, (or of said sheet if same is unique) is that advantage can be taken of the physical continuous thereof at the location of said portions 21 to create therein an articulation area (however fixed if there is integration into the thickness of the wall 5, as in FIG. 9 or 10, without breaking the vacuum created by the VIP constitution.

However, the simple use of said flexible sheet(s) will create a discontinuity of thermal insulation between the two consecutive pockets 19 thus joined.

In some cases, the intermediate portions 21 could have significant surfaces that are all the more troublesome in terms of thermal bridges; but it may also be necessary to place a panel 50 or a sleeve 47 in support, for example to position same correctly in relation to the environment thereof.

All the more in these cases, there may be a benefit in defining a bulging portion 59 between two articulation areas 21 (each formed by the aforementioned flexible sheet(s) applied against one another), each area being itself joined laterally on one side to the pocket 19 concerned, this regularly or not in the chain, as shown in FIG. 6 or 10.

Each bulging portion 59 may contain a thermal insulation 23, for example as a blanket. It may, for example, be of flexible product, as a blanket, known as Spaceloft®, a SIAP (Super Insulation at Atmospheric Pressure) proposed by the company ISOLProducts with a thermal conductivity: λ=0.01 to 0.02 W/m·K. A PCM layer 15 (FIG. 10) may also be contained, each of said portions 59 being therefore favourably enveloped in the aforementioned flexible sheet(s) (to maintain a VIP constitution). Said bulging portions 59 will favourably have a convex outer surface, in particular enabling a support against concave supplementary outer surfaces.

Nevertheless, in said solution with bulging portion(s) 59, the intermediate portions 21 are not fully thermally insulating.

Also, it is proposed (as illustrated in FIG. 5) that the intermediate portions 21 are defined by at least one structure 79 of thermally insulating material 23 (preferably porous so as to be integrated into the overall VIP structure), providing a continuity of thermal insulation between said two pockets. The insulating material may be identical to the porous thermally insulating material of the pockets; likewise for same of the areas 59.

In the example of FIG. 5, the porous material (here in plate form) of each flexible structure 79 that extends along the thickness between the flexible sheet(s) 49 of the envelope 37, is interrupted in the porous thermally insulating material 23 which fills the pockets 19. However, there could be continuity.

Thicker than the impregnated fabrics, for example more than 2.5 to 3 times thicker, and for example formed in a block, as illustrated, the pockets 19 of thermally insulating material 23 will typically be stiffer than the flexible articulation structures 79.

So that the panel 50 thus formed acquires the VIP constitution thereof, under partial vacuum, of course such a vacuum will be created, with sealing, after the layers or plates of porous material 23, 81 have all been enveloped by the sealed flexible sheets 49.

To produce the structures 79, it will be possible in particular to use a flexible polymeric mesh support (for example an organic or inorganic woven or non-woven fabric, or a web) such as a polyester or a polyamide of a few mm thick impregnated with an aerogel 81, for example silica, or the pyrolate thereof (pyrolysed aerogel, it being specified that said alternative pyrolate applies to each case of the present description wherein a porous thermally insulating material is concerned).

For information, an insulation structure presented above with VIP pockets 19 with for core material a nano-porous aerogel or the pyrolate thereof may have a thermal conductivity lower than 10 mW·m−1. K−1 for an internal pressure of 2 to 5 to $10^{-3}$ Pa. The negative pressure in the pockets, or even the portions 21, may be that usual of VIP: $10^{-3}$ to $10^3$ Pa.

In connection with, in particular FIGS. 6, 8, 10, it will further be noted, as already mentioned, that it may be advantageous that at least some pockets of VIP constitution and/or areas of intermediate portions contain at least one PCM, said material 15 being identical to or different from same of the elements 13 of PCM type.

If there are two layers of said material, the second layer will be, where the two layers exist, arranged around the first layer, with interposition of the material 23 between same. The first change of state temperature of the first layer will be a priori greater than the second, different, change of state temperature of the second layer, so as to insulate the interior better, in combination with the pockets 19 of VIP constitution interposed between said layers.

If there is only one layer of said material 15, it will therefore be favourably surrounded by the material layer 23, at the location of the pockets 19, and by the material 81 if the flexible intermediate portions 21 are provided. In several figures, INT the side of the volume 7 and EXT the (environment) outside have also been marked.

FIG. 4, it may again be noted in 89a, 89b, means for retaining thereon of the strip 50, once folded thereon. A solution by clip, by hook and loop fastener, Velcro™ type, or other.

It should also be noted that the pockets 19 will not necessarily be strictly flat. Thus, a curved shape is possible, as in the example of FIG. 3. Said shape can be achieved by shortening the length of the sheet of the envelope 37 on one side in relation to the length of the sheet of the other side. Once sealed, the pocket will bend naturally under the mechanical stress exerted.

As illustrated in FIGS. 9, 11, it will be further noted that, to promote the heat exchanges in the chambers 7, and therefore the efficiency of the unit 1, it will be preferred that baffles 12 are created in the unit 1, so that the fluid 9 circulating therein follows a path that will meander.

FIG. 9 makes it possible to understand that such baffles 12 may be formed by the fact that each transverse wall 29 and the through passage 30 thereof form a retarder to the free circulation of the fluid between the inlet 33 thereof and the outlet 35 thereof.

Preferably, to accentuate this "baffling" effect, the passages 30 between the bodies will be favourably offset from one passage to the next, parallel to the axis 27, as illustrated in the figure.

In the variant in FIG. 11, a single module 3 with a single body 330 was imagined, with, for example, a lateral inlet 33 through an area of the peripheral wall 5 thereof. The baffles 12 are (essentially) created here by the internal partitions 29 which, within the space 7 delimited by the peripheral wall 5 and the pierced bottom 290, split said space into sub-volumes 7a, . . . 7c.

Each partition 29 interrupting at one of the lateral ends thereof before reaching the wall 5, this is where each passage 30 is created which, in connection with the partition concerned and preferably an alternation in the lateral end thus open, forms a baffle. Arrived at the last sub-volume, the fluid leaves the body through the pierced bottom. Each sub-volume contains elements 13.

In both cases (FIGS. 9 and 11), the circulation of the fluid is therefore substantially following a succession of S (see arrow in FIG. 11).

FIG. 9 also makes it possible to reinforce the fact that at least some of the thermal management elements may, placed in the pockets 19, be integrated into the material constituting the outer walls 5 of the bodies, even if the pockets are not shown in the figure; only the layers 15 and 23, being also specified that one or more such pockets may or may not be arranged in the bottom 29.

FIGS. 12, 13 show the operational use of at least one modular block 3 or a unit 1 with several blocks on the oil circuit 70 of an engine 72, it being specified that the use of said blocks or the unit on a water circuit (or liquid other than the oil) will be interesting, for example on an engine cooling circuit, by coupling with a gas (e.g. air)/liquid (e.g. water) or liquid (e.g. fresh water)/liquid (e.g. seawater) exchanger.

The circuit 70 defines here an oil circulation path whereon are arranged, in fluid communication with one another, an oil sump 74 and functional components of the engine to be oiled, such as the bearings of connecting rods and of the crankshaft, but also of the camshaft and the driving device thereof, 76. The sump 74, the vessel (a priori metal) of which is screwed under the engine block 720, with a seal, contains the oil necessary for the lubrication of the moving parts of the lower engine and of the upper engine. The oil is drawn by the strainer of the oil pump 78 which distributes same under pressure, preferably via an oil filter, to the various components (crankshaft, connecting rods, camshaft, etc.). The oil can then go back down again by simple gravity; arrows 80. The sump is equipped at the lowest point thereof with a bleed screw with sealing washer, dedicated to the periodic oil change of the engine.

Two assemblies are more specifically presented, as non-limiting examples.

In the first, illustrated in FIG. 12, a unit 1, like same in FIG. 1, assembled, is connected via the connector 33, 35 to the branch 300 of the oil circuit 70 which communicates with the oil bath 82 of the sump 74. The pump 11 provides the circulation of oil in the unit and the branch 300. Thus, the oil bath 82 will be able to benefit from an oil at appropriate temperature, in particular avoiding a temperature that is too low in winter (favourable to a cold start). Another pump 78 takes oil from the bath to distribute same to the relevant components of the engine, via the branch 301 of the circuit 70. This solution can be adapted to a "dry sump" lubrication. The oil will then no longer be contained in the sump, but in an independent tank where it will be directly drawn, before passing into the unit 1, to then be transferred to the areas to be lubricated, the return being made directly into the tank.

In the second assembly, illustrated in FIG. 13, a unit 1 (which could still only include a block, like that in FIG. 11, with the connectors thereof), is placed via the fluid inlet/outlet connection 33, 35 directly on the closed oil circuit 300 which passes through the aforementioned relevant components of the engine 72 and the sump 74. The pump 11 provides the circulation of oil in the unit 1 and the entire circuit 300. The unit 1 is arranged in the oil sump 74. The oil thus passes from the bath 82 into the unit 1 wherefrom it is taken to circulate towards said components to be oiled. Such an integration enables savings of space, or even of weight and efficiency (potentially less pressure loss and thermal protection that can further be increased by insulating the wall of the sump 74).

It will be understood that above the term "oil" is to be understood in the broad sense, as "a lubricating fluid for the engine". And it will also be noted that it is advantageous for the lubrication circuit 70 of the engine to therefore define a circulation path for the lubricating fluid whereon will be arranged the means (11 or 78) for circulating the lubricating fluid, the sump 74, the functional components (such as 76) of the engine to be lubricated, to be placed in heat exchange relationship with the fluid 9 coming from the unit 1, and the unit 1 containing at least the volume 7:

which contains the elements 13 for storing and subsequent releasing thermal energy, of PCM type, placed in a heat exchange relationship with said lubricating fluid 9,
and around which are therefore arranged at least the first and second layers 15, 23.

The invention claimed is:

1. A unit for storing and releasing thermal energy, said unit comprising:
    a plurality of modular blocks, each of said modular blocks comprising:
        individualized elements configured to store and release said thermal energy including at least one phase change material (PCM); and
        a body comprising:
            a chamber in which said individualized elements are loosely disposed, the chamber being defined within the outer walls of the body assembled by a bottom closing on one side the chamber, and
            a communication passage configured to connect the chamber to an adjacent chamber of an adjacent modular block of the plurality of modular blocks to establish fluid-connected modular blocks, the communication passage configured for the circulation of a fluid the chambers and the adjacent chamber through said communication passage, in heat exchange relationship with said individualized elements in each chamber,
    attachment means configured to attach together the respective fluid-connected modular blocks, such that said fluid can circulate between said fluid-connected modular blocks via the communication passages, and
    thermal management elements configured to thermally manage the chambers, the thermal management elements being arranged around said chambers and at least some of the thermal management elements comprising a thermally insulating material,
wherein:
    each chamber is open on one side other than the bottom, for placing therein or removing therefrom said individualized elements, and the modular blocks further individually include a sealing surface surrounding the open side of the chamber, for providing sealing in relation to the fluid, such that the fluid-connected modular blocks can be arranged with the chambers thereof face to face or back to back, then modular blocks being stacked along an axis, and the communication passages passing through the bottoms of the chambers,
    the fluid comprises one of a refrigerating fluid and a heat-transfer fluid,
    and at least some of the thermal management elements include a PCM.

2. The unit according to claim 1, wherein at least some of the thermal management elements are arranged in at least one flexible envelope forming one or more panels.

3. The unit according to claim 2, wherein the flexible envelope also contains thermally insulating material.

4. The unit according to claim 2 wherein, to allow the fluid to circulate from one chamber to another, each communication passage is offset from an adjacent communication passage in an adjacent chamber, parallel to said axis, to define baffles.

5. The unit according to claim 1, wherein at least some of the thermal management elements including a thermally insulating material are under partial vacuum, for defining a vacuum insulation panel.

6. The unit according to claim 1, wherein the body of each block integrates into the outer wall at least one cavity which receives at least one portion of the PCM of said thermal management elements.

7. The unit according to claim 1, wherein the bodies of said modular blocks are stacked on top of each other so that externally said outer walls define supports against which are applied the thermal management elements, which are blocked laterally by protrusions that maintain respective spaces having respective thicknesses of said thermal management elements, between the outer walls of the bodies and an outer mechanical protection envelope that surrounds the blocks.

8. The unit according to claim 1, wherein the blocks are configured in a stack, the first and/or last blocks of the stack receive being closed by at least one cover which, above an opening of the respective chamber, closes said respective chamber, the at least one cover being provided with a thermal insulation element comprising a thermally insulating material and a connector configured to connect said chamber opening to an outer fluid circuit configured to provide the fluid.

\* \* \* \* \*